United States Patent
Bronder et al.

(10) Patent No.: US 10,395,418 B2
(45) Date of Patent: Aug. 27, 2019

(54) TECHNIQUES FOR PREDICTIVE PRIORITIZATION OF IMAGE PORTIONS IN PROCESSING GRAPHICS

(71) Applicant: Microsoft Technology Licensing, LLC, Redmond, WA (US)

(72) Inventors: Matthew L. Bronder, Bellevue, WA (US); Andrew Z. Yeung, Seattle, WA (US); Alexander Nankervis, Seattle, WA (US); Jack A. Elliott, Seattle, WA (US); Matthew D. Sandy, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 70 days.

(21) Appl. No.: 15/681,107

(22) Filed: Aug. 18, 2017

(65) Prior Publication Data
US 2019/0057542 A1 Feb. 21, 2019

(51) Int. Cl.
*G06F 3/01* (2006.01)
*G06T 3/00* (2006.01)
(Continued)

(52) U.S. Cl.
CPC ............ *G06T 15/205* (2013.01); *G06F 3/012* (2013.01); *G06T 3/0006* (2013.01);
(Continued)

(58) Field of Classification Search
CPC ..... G09G 2320/02; G06F 3/013; G06F 3/011; G02B 27/0093; G02B 27/017; G06T 2207/20076; H04N 13/366; H04N 21/4318
See application file for complete search history.

(56) References Cited

U.S. PATENT DOCUMENTS 5,933,125 A * 8/1999 Fernie ................. G02B 27/017
                                                      345/619
9,063,330 B2    6/2015 LaValle et al.
(Continued)

OTHER PUBLICATIONS

Orland, Kyle, "How Valve got passable VR running on a four-year-old graphics card", https://arstechnica.com/gaming/2016/03/how-valve-got-passable-vr-running-on-a-four-year-old-graphics-card/, Published on: Mar. 21, 2016, 5 pages.
(Continued)

*Primary Examiner* — Haixia Du
(74) *Attorney, Agent, or Firm* — Arent Fox LLP

(57) ABSTRACT

Examples described herein generally relate to prioritizing portions of images for rendering in a computing device. A probability field for prioritizing portions of an image of a scene for processing can be determined, where the probability field includes a set of values each corresponding to a likelihood of a rendering parameter acquiring an altered value between a render time at which at least a portion of the image is rendered and a display time at which the image is displayed. A shaped probability field can be generated based at least in part on applying the probability field to an original target shape associated with a display. The shaped probability field can be provided to a downstream node for prioritizing, based at least in part on one or more of the set of values in the probability field, a portion of the image in processing the image.

20 Claims, 6 Drawing Sheets

(51) Int. Cl.
G06T 5/00 (2006.01)
G06T 5/50 (2006.01)
G06T 11/00 (2006.01)
G06T 15/20 (2011.01)

(52) U.S. Cl.
CPC ............ *G06T 3/0087* (2013.01); *G06T 5/006* (2013.01); *G06T 5/50* (2013.01); *G06T 11/00* (2013.01); *G06T 2207/20076* (2013.01); *G06T 2215/16* (2013.01)

(56) References Cited

U.S. PATENT DOCUMENTS

| | | |
|---|---|---|
| 9,256,987 B2 | 2/2016 | Ackerman et al. |
| 2012/0105473 A1 | 5/2012 | Bar-Zeev et al. |
| 2014/0361977 A1 | 12/2014 | Stafford et al. |
| 2015/0235417 A1 | 8/2015 | Schowengerdt et al. |
| 2015/0378155 A1 | 12/2015 | Kuehne et al. |
| 2016/0027215 A1 | 1/2016 | Burns et al. |
| 2017/0004648 A1 | 1/2017 | Li |
| 2017/0180721 A1 | 6/2017 | Parker et al. |

OTHER PUBLICATIONS

Laviola Jr., Joseph J., "Double Exponential Smoothing: An Alternative to Kalman Filter-Based Predictive Tracking", In Proceedings of the workshop on Virtual environments, May 22, 2003, 8 pages.

Marbach, Jonathan, "GPU acceleration of stereoscopic and multi-view rendering for virtual reality applications", In Proceedings of the 16th ACM Symposium on Virtual Reality Software and Technology, Nov. 18, 2009, pp. 103-110.

Esser, Ingo, "VR SLI: Accelerating OpenGL Virtual Reality with Multi-GPU Rendering", https://devblogs.nvidia.com/parallelforall/vr-sli-accelerating-opengl-virtual-reality-multi-gpu-rendering/, Published on: Dec. 21, 2015, 11 pages.

Choi, et al., "Prediction-Based Latency Compensation Technique for Head Mounted Display", In Proceedings of the International SoC Design Conference, ISOCC 2016, Oct. 23, 2016, pp. 9-10.

Chow, et al., "Large Object Segmentation with Region Priority Rendering", In Proceedings of the 2005 Australasian Ontology Workshop—vol. 58, 2005, pp. 19-28.

"International Search Report and Written Opinion Issued in PCT Application No. PCT/US2018/038392", dated Oct. 2, 2018, 11 Pages.

Waveren, J.M.P. VAN., "The Asynchronous Time Warp for Virtual Reality on Consumer Hardware", In Proceedings of the 22nd ACM Conference on Virtual Reality Software and Technology, 2016, Nov. 2, 2016, pp. 37-46.

\* cited by examiner

TECHNIQUES FOR PREDICTIVE PRIORITIZATION OF IMAGE PORTIONS IN PROCESSING GRAPHICS

BACKGROUND

Use of computing devices is becoming more ubiquitous by the day. Computing devices range from standard desktop computers to wearable computing technology and beyond. One area of computing devices that has grown in recent years are gaming devices and virtual reality (VR) devices, which rely on a graphics processing unit (GPU) to render graphics from a computing device to a display device based on rendering instructions received from the computing device. In gaming devices, an image to be produced on a display device can be oriented or modified based on user input (e.g., movement of a gamepad button or stick to cause movement of the orientation of the scene, introduction of items into the scene, etc.). Similarly, in VR devices, the image to be produced on a display device can be oriented or modified based on user input, where the input may include detecting movement of the user's head (e.g., detected movement of the VR device mounted on the user's head).

In any case, the device may detect a desired change of orientation at any given time (e.g., by detecting change in head position). Where the change of orientation occurs near a time that the image is displayed by the device or where multiple changes are processed by the device in a short period of time (e.g., due to quick or continuous head movement), however, the device may not have that correct orientation of the image rendered for display (e.g., because the predicted head position is slightly incorrect from the actual head position at the time of rendering the image). Conventional devices have attempted to address this issue by overrendering the image at a resolution greater than a predicted visible region on the display, such to result in rendering of a larger image that may correspond to the change of orientation, and then reprojecting a relevant portion of the overrendered image on the display based on determining the desired portion of the image (e.g., based on head position).

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a method for processing images using probability fields in a computing device is provided. The method includes determining a probability field for prioritizing portions of an image of a scene for processing, where the probability field includes a set of values each corresponding to a likelihood of a rendering parameter acquiring an altered value between a render time at which at least a portion of the image is rendered and a display time at which the image is displayed. The method also includes generating a shaped probability field based at least in part on applying the probability field to an original target shape associated with a display, and providing the shaped probability field to a downstream node for prioritizing, based at least in part on one or more of the set of values in the probability field, a portion of the image in processing the image.

In another example, a computing device for processing images using probability fields is provided. The computing device includes a memory storing one or more parameters or instructions for executing an operating system and one or more applications, a display interface coupled with a display device for communicating signals to display rendered frames on the display device, and at least one processor coupled to the memory and the display interface. The at least one processor is configured to determine a probability field for prioritizing portions of an image of a scene for processing, where the probability field includes a set of values each corresponding to a likelihood of a rendering parameter acquiring an altered value between a render time at which at least a portion of the image is rendered and a display time at which the image is displayed, The at least one processor is also configured to generate a shaped probability field based at least in part on applying the probability field to an original target shape associated with the display device, and provide the shaped probability field to a downstream node for prioritizing, based at least in part on one or more of the set of values in the probability field, a portion of the image in processing the image for display on the display device.

In another example, a non-transitory computer-readable medium, including code executable by one or more processors for processing images using probability fields in a computing device is provided. The code includes code for determining a probability field for prioritizing portions of an image of a scene for processing, where the probability field includes a set of values each corresponding to a likelihood of a rendering parameter acquiring an altered value between a render time at which at least a portion of the image is rendered and a display time at which the image is displayed, generating a shaped probability field based at least in part on applying the probability field to an original target shape associated with a display, and providing the shaped probability field to a downstream node for prioritizing, based at least in part on one or more of the set of values in the probability field, a portion of the image in processing the image.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

Figure 1:
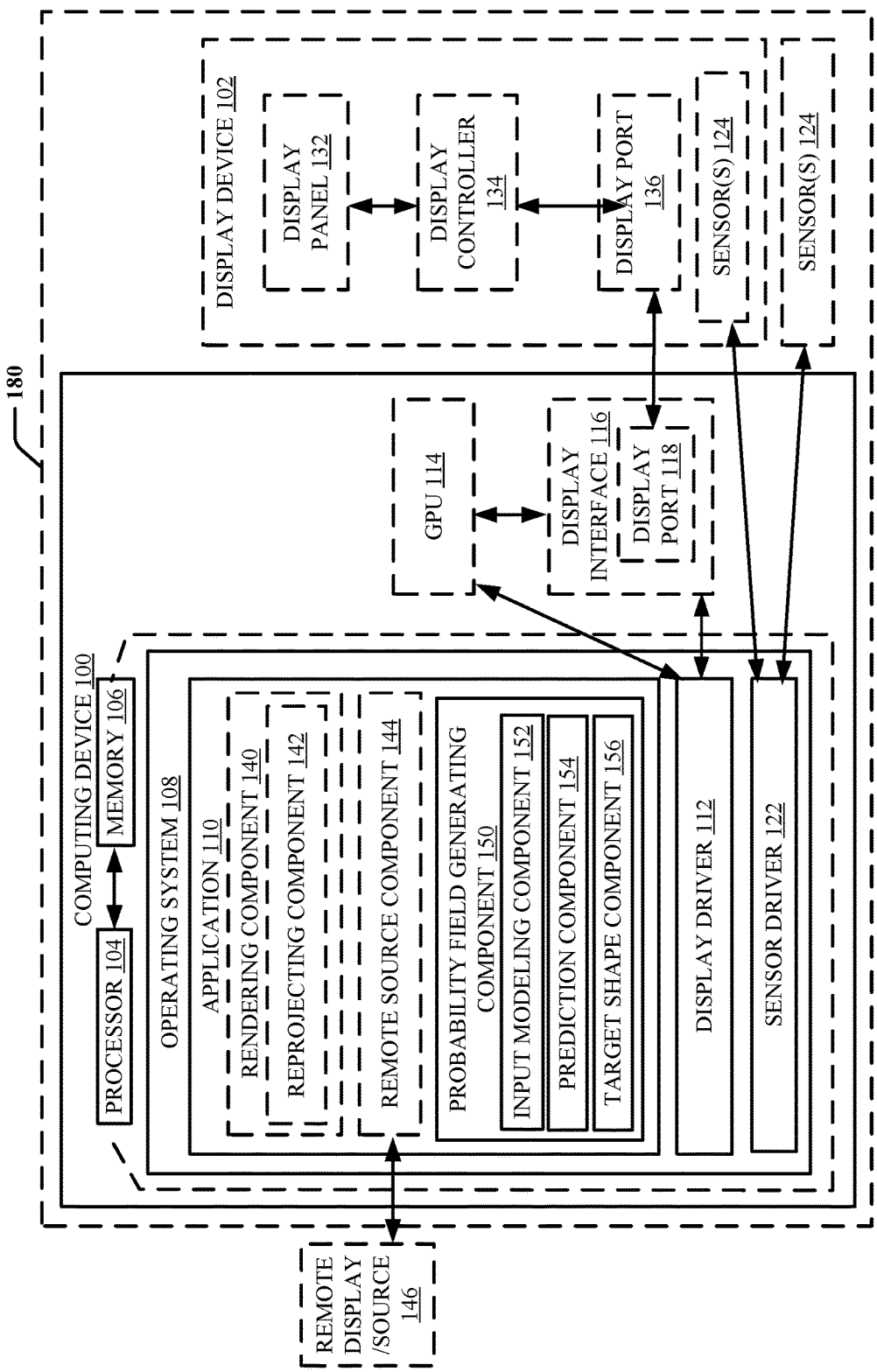
FIG. 1 is a schematic diagram of an example of a computing device and display device communicatively coupled for rendering images in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to providing predictive prioritization of image portions in rendering graphics. For example, a probability field can be used for prioritizing portions of an image of a scene for processing (e.g., in displaying or rendering the image), where the priority field can be determined based at least in part on predicting a likelihood that one or more rendering parameters for portions of the image may be altered between a time at which at least a portion of the image is rendered and a time at which the image is displayed (e.g., through reprojection instructions received for the image). For example, reprojection can refer to a transform between two projective spaces where, in virtual reality (VR) for example, one space is defined by the head position prediction at one point, and another space to which an image can be transformed, can be defined by a different head position predicted at another point. Specifically, in an example, reprojection can include predicting a head position for some time in the future, initially rendering a scene using the predicted head position, acquiring another prediction of the head position at another time but for the same time in the future, and transforming the scene using the new prediction of the head position.

In one example, the likelihood that the one or more rendering parameters may be altered can be indicative of a predicted scene orientation that may be desired at the time of displaying the image, which may be determined based on considerations of a device (e.g., a position of a head-mounted display in virtual reality (VR)). In addition, the probability field can be applied to an original parameter field (also referred to herein, or represented by, a target shape) of a display device on which the image is to be displayed, such that the probability field can define a topology of one or more contour lines based on the target shape, where each contour line in the topology can define a certain probability of alteration of the one or more rendering parameter values. The probability field can be used to determine, based on the probabilities and/or associated contour lines, portions of the image to prioritize in rendering or displaying the images.

In an example, the probability field may be determined based on a prediction error model of previous predicted parameter values for one or more rendering parameters as compared to actual parameter values for the one or more rendering parameter at the time of displaying the image. In another example, the probability field may be determined based on one or more parameters defined by a human model (e.g., a model that indicates limitation in musculoskeletal movement of a human body). In another example, the probability field may be determined based on one or more parameters defined by an application limiting a viewable portion of an image.

In a specific example, given one or more parameters regarding a position of a head-mounted display (e.g., in VR), possible alterations in a rendering parameter by the time the display is updated can be predicted. For example, the rendering parameter may correspond to whether to render a portion (e.g., pixel) of an image. In this example, some portions of the image that are outside of the target shape of the VR device can be predicted as more probable to be within a displayed image than other portions. The probability field can be generated (or modified) based on predicted change in scene orientation (e.g., based on predicted change in position or orientation of the head-mounted display). The probability field can accordingly be applied to the target shape of the head-mounted display to define portions of the image outside of the target shape such to prioritize the portions of the image of the scene. For example, prioritizing the portions may include overrendering the image to include the additional portions of the scene outside of the target shape, based on the corresponding probability indicated in the probability field, in anticipation of reprojection to include one or more of the portions. This can provide a more accurate overrendered image from which to display a relevant portion on the VR device based on a determined scene orientation at the time of display.

In another specific example, the probability field may be provided to a remote video source to determine portions of an image to provide to a client application for displaying. For example, the remote vide source can apply the probability field to an image (e.g., a frame in a video) to determine a portion of the image to provide to the client application, which can save bandwidth by not sending the entire image. This can include applying the probability to a target shape of the display at the client. In one example, the client application can apply the target shape to the probability field, and provide the shaped probability field to the remote video source. Moreover, as described, the probability field may be an improved prediction of desired portions of the image based on modeling previous predictions, the human body, limitations in the application, etc.

Figure 2:
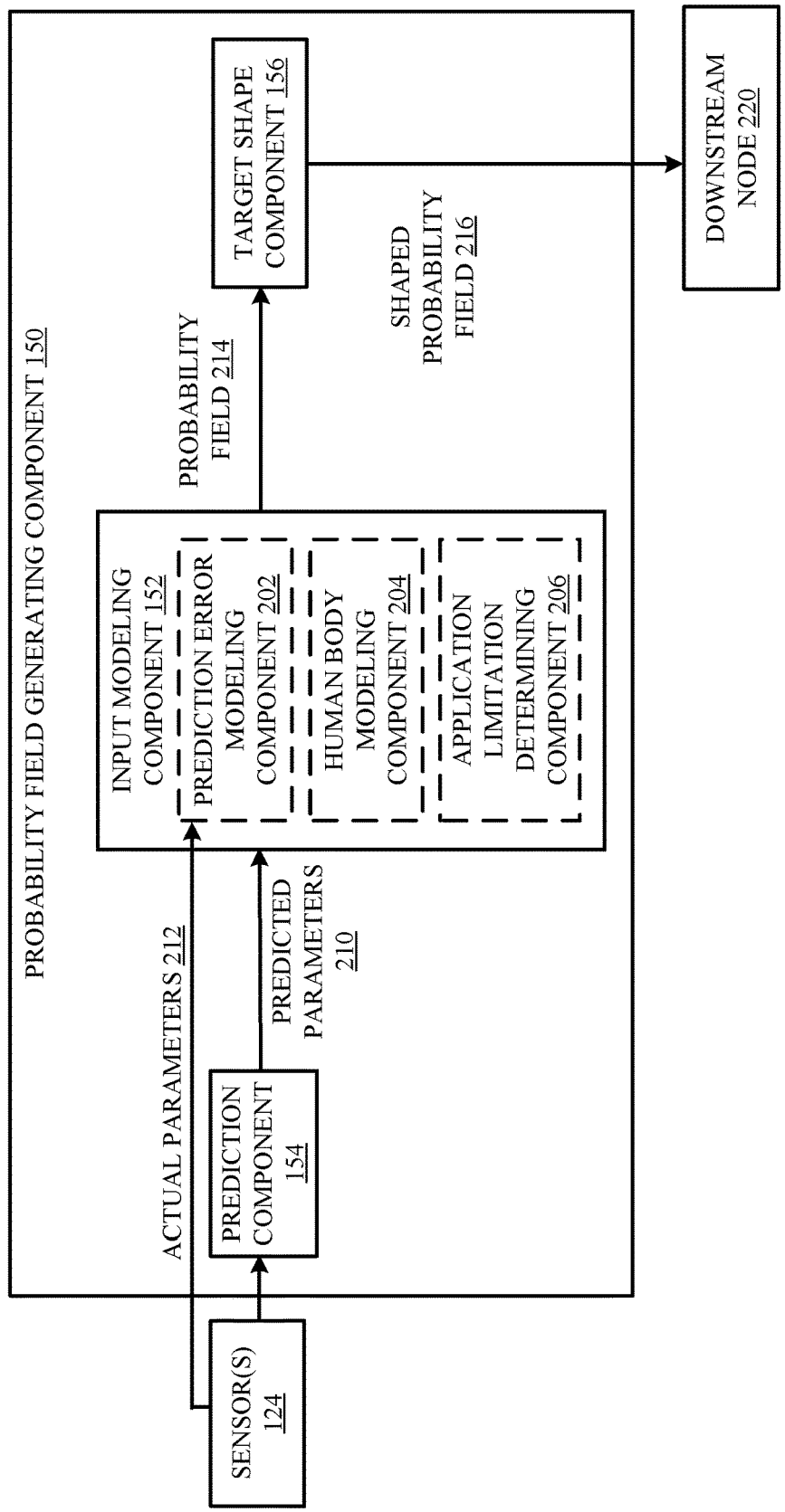
FIG. 2 is a schematic diagram of an example of a probability field generating component for generating a probability field for use in processing an image for rendering or display in accordance with examples described herein.
Figure 3:
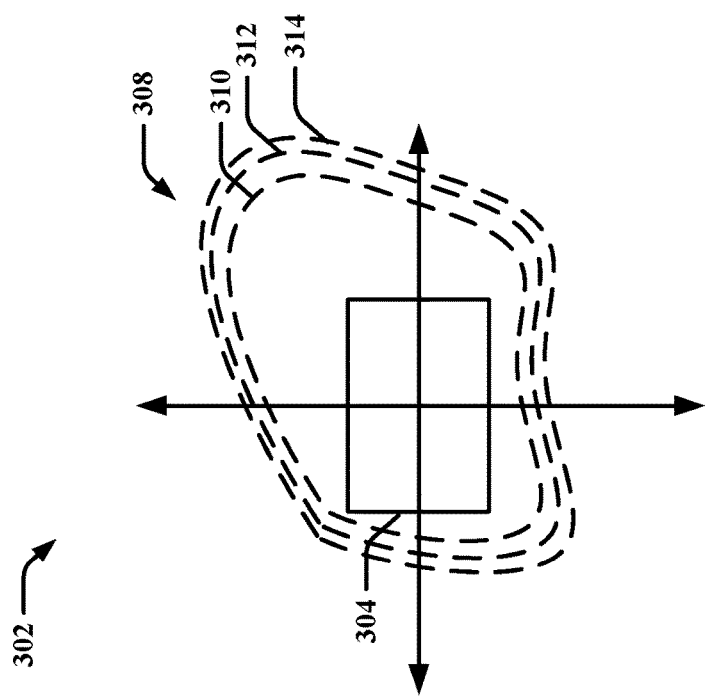
FIG. 3 is an illustration of graphical examples of contours defined by a probability field for rendering an image on a two-dimensional plane in accordance with examples described herein.
Figure 3:
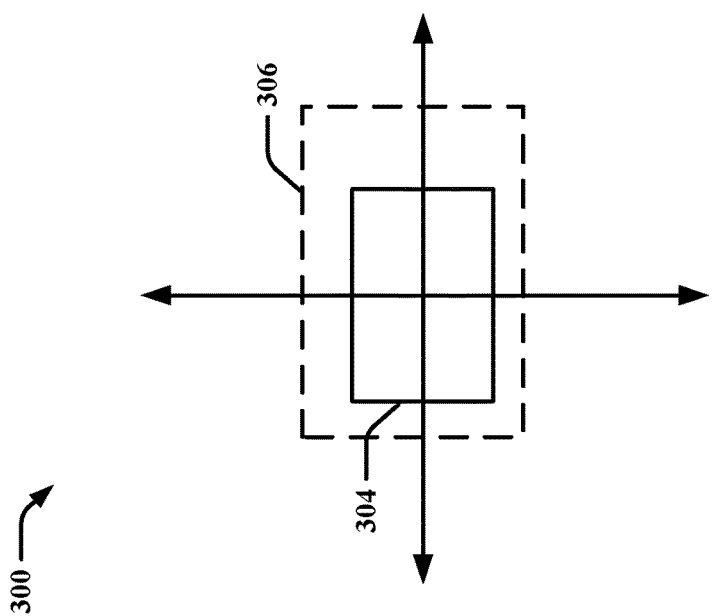
Figure 4:
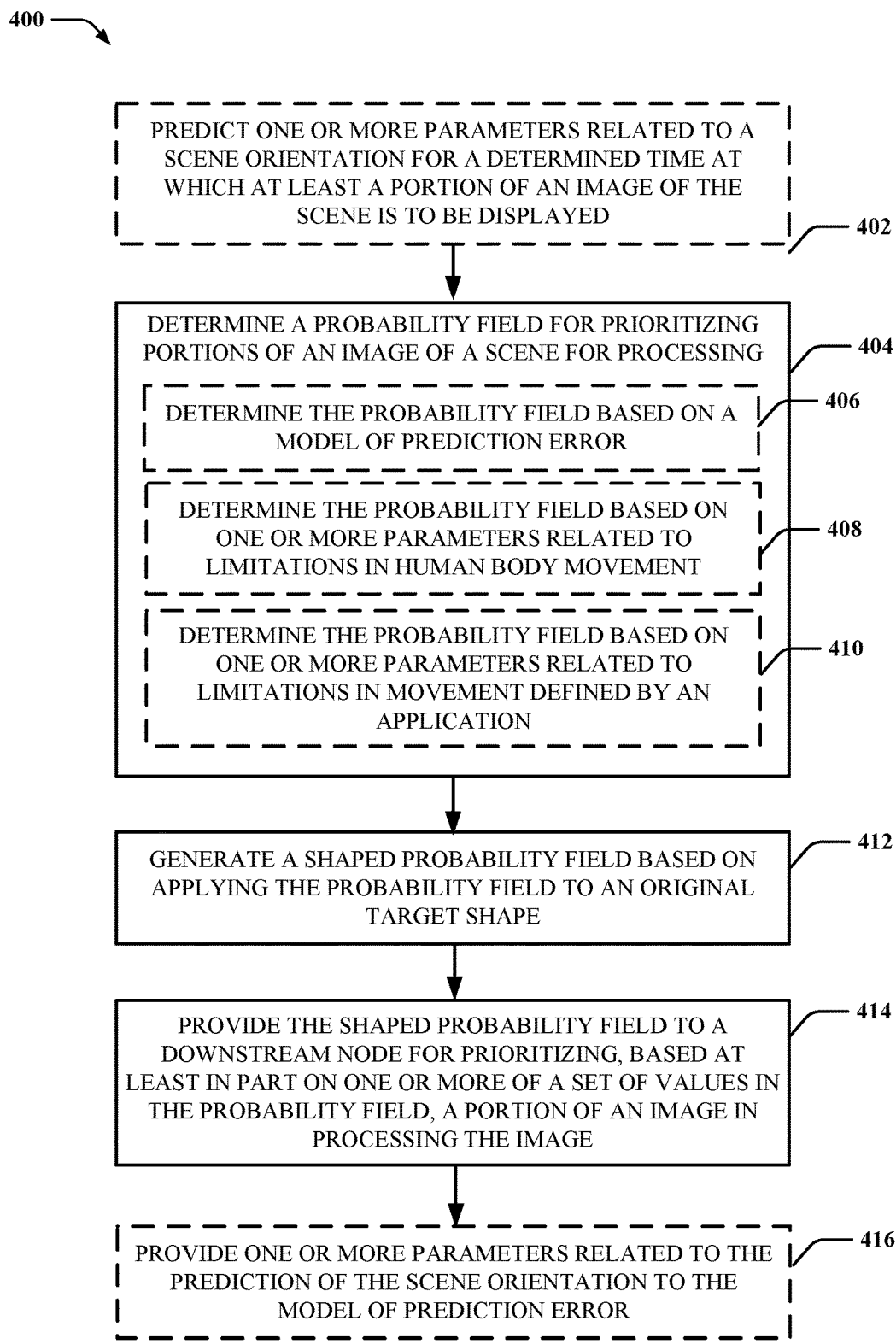
FIG. 4 is a flow diagram of an example of a method for providing a contour for overrendering an image in accordance with examples described herein.
Figure 5:
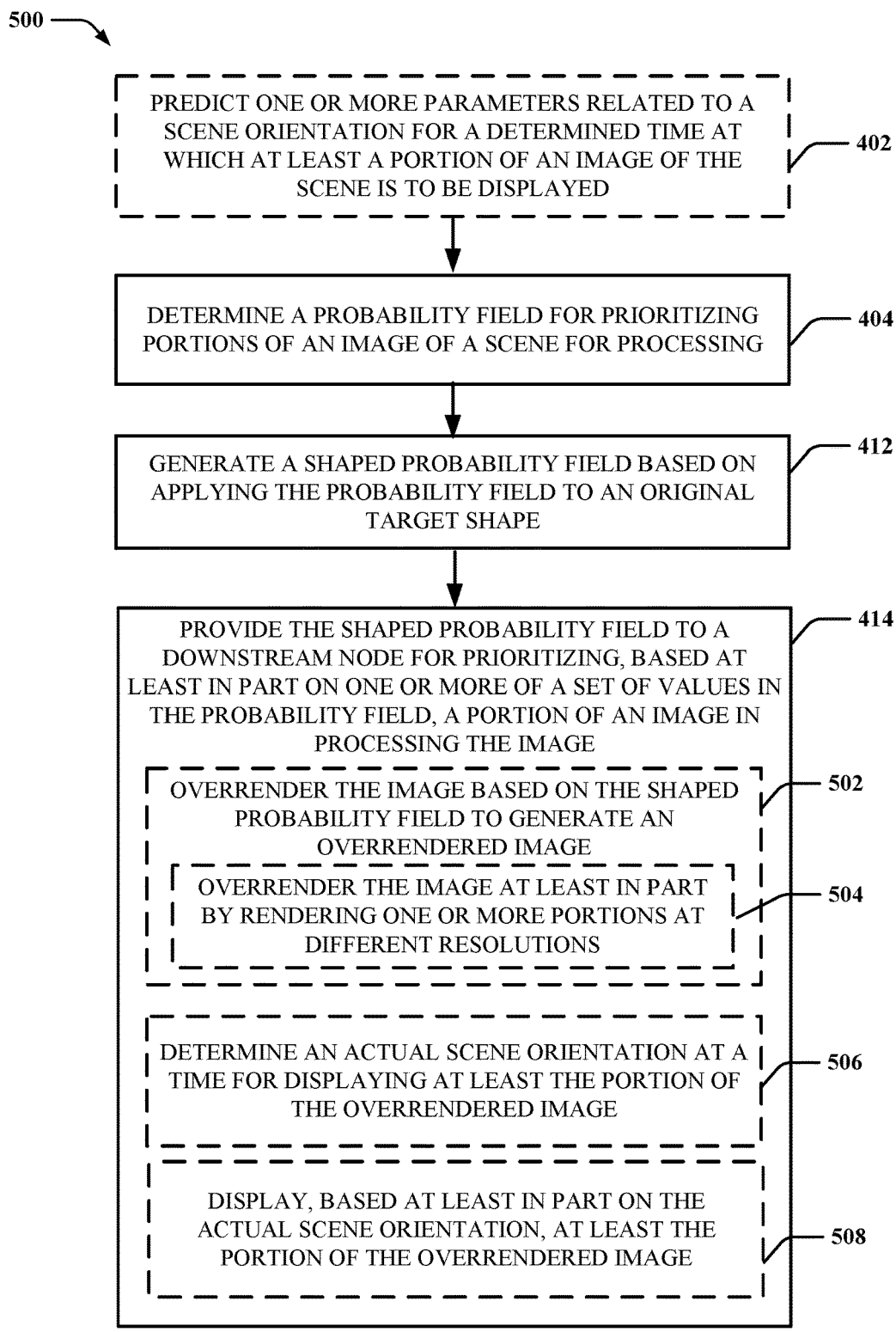
FIG. 5 is a flow diagram of an example of a method for overrendering an image based on a provided contour in accordance with examples described herein.

Turning now to FIGS. 1-7, examples are depicted with reference to one or more components and one or more methods that may perform the actions or operations described herein, where components and/or actions/operations in dashed line may be optional. Although the operations described below in FIG. 4-5 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIGS. 1 and 2 are schematic diagrams of examples of a computing device 100, display device 102, remote display/source 146, and/or related components, which can communicate image data for displaying images on the display device 102, remote display/source 146, and/or on other devices. For example, the display device 102 may be an internal display that is within the same housing 180 as computing device 100, a display device that is external to computing device 100, and/or the like. Display device 102 may be capable of displaying a two-dimensional image, such as a desktop, a three-dimensional world, etc. Remote display/source 146 may be a remotely located display and/or source of images for displaying by the computing device 100, as described further herein.

For example, computing device 100 may include or may otherwise be coupled with a processor 104 and/or memory 106, where the processor 104 and/or memory 106 may be configured to execute or store instructions or other parameters related to communicating image data to the display device 102, remote display/source 146, etc., as described herein. Computing device 100 may execute an operating system 108 (e.g., via processor 104 and/or memory 106) for providing an environment for executing one or more applications 110, such as one or more applications 110 that produce images for display by the display device 102, remote display/source 146, etc. and/or obtain images from the remote display/source 146 for displaying on display device 102 or other devices. For example, the computing device 100 may include a VR device, and additionally, the one or more applications 110 may be one or more VR applications operable to cause the generation of VR images on the display device 102 of the VR device. The operating system 108 may also include a display driver 112 for communicating with a GPU 114 and/or with a display interface 116 of the computing device 100 (e.g., directly or via GPU 114) to cause rendering of one or more images for display on the display device 102.

In an example, display interface 116 can be communicatively coupled with the processor 104 and/or memory 106 for communicating with the display device 102 via a display port 118. Display port 118, as referred to herein, may include one or more of various types of ports, including a high definition multimedia interface (HDMI) port, a display serial interface (DSI) port, a mobile industry processor interface (MIPI) DSI port, a universal serial bus (USB) port, a Firewire port, or other embedded or external wired or wireless display ports that can allow communications between computing device 100 and display device 102.

For example, display device 102 may include a display panel 132 for displaying one or more images based on signals received from a display controller 134. For example, the display panel 132 may include a liquid crystal display (LCD) (which may include a light emitting diode (LED) backlit LCD display), organic LED (OLED) display, digital light processing (DLP) display, etc. Display device 102 may include, but is not limited to, a head-mounted display having a single display panel or multiple display panels (e.g., one for each of two eyes) to view on the head-mounted display, a monitor, a television, a projector, or substantially any type of embedded, external, wireless, etc., display configured for communicating with computing device 100 via an embedded, external, or wireless display port 136. As mentioned, display controller 134 provides signals to the display panel 132 to cause display of images. In an example, display controller 134 may include a printed circuit board (PCB), programmable logic controller (PLC), etc., coupled with the display panel 132 to control the display panel 132 to display images based on commands received via display port 136. Thus, for example, display controller 134 may be or may include a processor configured for sending the signals to the display panel 132 based on image data (e.g., rendered image frames) received via display port 136.

In an example, computing device 100 can generate image data for providing to the display device 102 for displaying one or more images on display panel 132. Computing device 100 can accordingly communicate the image data to the display device 102 via display interface 116 using display port 118 to communicate signals corresponding to the image data to display port 136 for providing to display controller 134. In an example, application 110 can obtain or otherwise generate images for displaying on display device 102, and display driver 112 may provide rendering instructions for rendering the images to GPU 114 (e.g., via display interface 116 or otherwise). In one example, GPU 114 can be part of the display interface 116 (e.g., a processor on a circuit board of the display interface 116). In another example, GPU 114, display interface 116, etc., may be integrated with processor 104. Substantially any combination of hardware can be possible such that GPU 114, display interface 116, etc., can communicate with processor 104 via a bus to facilitate providing the rendering instructions from the display driver 112 executing on the processor 104 (e.g., via the operating system 108) to the GPU 114. GPU 114 can process the rendering instructions to render an image, and can initiate display of at least a portion of the image on the display device 102 (e.g., where the image is overrendered) by transmitting associated signals to the display device 102 via display port 118 of display interface 116. The display device 102 can receive the signals generated by the GPU 114, and display controller 134 can accordingly cause display panel 132 to draw or display the image based on the signals.

The computing device 100 (and/or display device 102) may also include one or more sensors 124, which can also be within the housing 180. The sensors 124 may include one or more devices that can communicate with (e.g., and are communicatively coupled with) computing device 100, processor 104, memory 106, etc. In an example, the sensors 124 may be coupled with the computing device 100 via an interface (e.g., universal serial bus (USB), serial port, wireless interface, such as Bluetooth, near field communications (NFC), Wi-Fi, etc., or substantially any other wired or wireless interface, which can be supported by the computing device 100 via a corresponding port communicating with processor 104, memory 106, etc. over a bus. For example, the one or more sensors 124 may be a camera for acquiring images, an accelerometer to determine acceleration of a movement associated with the housing holding the accelerometer, a gyroscope to determine an orientation or position of the housing holding the gyroscope, a magnetometer for determining a direction or an absolute orientation such as in a north/east/south/west plane of the earth, etc., and/or any combination thereof, such as but not limited to an inertial measurement unit (IMU). In this regard, operating system 108 may also include one or more sensor drivers 122 to communicate with the one or more sensors 124 to obtain data therefrom.

The application 110 can function to display images on the display device 102 in a virtual reality or other first-person environment, for example. In this regard, the application 110 may optionally include a rendering component 140 for rendering the images for display on display device 102. In this example, the images to display can be obtained based on a scene orientation that may be modified based on one or more inputs (e.g., input from a gyroscope sensor (e.g., sensor 124) in the housing 180 of computing device 100 or of another device, an input from a mouse, joystick, D-pad, or other controller, etc.). Thus, for example, changes in the scene orientation can be detected based on the input, and rendering component 140 can determine an image to be rendered to reflect the scene orientation. In an example, images can be displayed at varying rates (e.g., a refresh rate), and changes in scene orientation may occur between the time an image is rendered and the time the image is displayed on display device 102. Accordingly, rendering component 140 may optionally include a reprojecting component 142 for updating the rendered image for display based on detected changes in scene orientation between the time the image is originally rendered by rendering component 140 and when the image is displayed on the display device 102. In one example, rendering component 140 can overrender the image at a size/resolution greater than that supported by the display device 102 in anticipation of having to reproject the image, and reprojecting component 142 can select a portion of the overrendered image for displaying on display device 102 based on a determined scene orientation (or detected change in scene orientation). In any case, rendering component 140 can cause display of the image (or portion of the image) via display driver 112, GPU 114, display interface 116, etc., as described above.

In another example, application 110 may include a remote source component 144 for providing the rendered or overrendered image to a remote display/source 146. In another example, remote source component 144 may obtain the images for display (or corresponding data from which an image can be generated) from the remote display/source 146. As described further herein, the reprojecting component 142 and/or remote source component 144 may receive one or more parameters regarding a probability field related to prioritizing processing (e.g., displaying or rendering) of an image determined based on one or more inputs.

The application 110 (and/or operating system 108, a combination thereof, or another portion of the computing device 100) can also include a probability field generating component 150 operable for generating a probability field for prioritizing portions of an image for processing in displaying the image, rendering the image, etc., as described further herein, where using the probability field can improve the likelihood that the image includes appropriate portions to account for predicted changes in scene before the image is displayed on the display device 102. The probability field generating component 150 can generate the probability field based on input modeling from an input modeling component 152, as described further herein. In an example, the input modeling component 152 may include inputs such as a prediction error model of previous predictions of one or more parameters related to scene orientation (such as head position), one or more parameters related to limitations of human body movement, one or more parameters related to limitations defined by the application 110, etc., which the probability field generating component 150 may use to determine a set of values for the probability field.

Moreover, for example, the probability field generating component 150 can apply an original parameter field (e.g., of display device 102), which defines a target shape, to the probability field to define a shaped probability field, which may include one or more contour lines that each correspond to a different probability value that a rendering parameter may change for a given portion of the scene within the contour line. In an example, probability field generating component 150 can include a target shape component 156 that can indicate an original parameter field defining a target shape of a display device (e.g., display device 102), which may include a rectangular shape, a pincushion shape, etc., as described further herein. Thus, a shape of the shaped probability field may include substantially any shape including the original target shape, which may be specified by the rendering component 140, a larger shape of the original target shape, an oblong or free-form type of shape based on the original target shape, etc.

The probability field generating component 150 may also include a prediction component 154 for predicting a change in scene orientation for the image (e.g., where the change can occur based on receiving one or more inputs after the image is rendered and before the image is displayed on display device 102). For example, prediction component 154 can predict the change in scene orientation based on inputs from the sensor(s) 124, which may include an acceleration, position, etc., of the housing 180 and/or display device 102 that are tracked by the sensor(s) 124, etc. The probability field generating component 150 can also generate the probability field, and/or determine a portion of an image of a scene to prioritize in processing (e.g., displaying or rendering) according to the probability field, based at least in part on the predicted change in scene orientation.

FIG. 2 illustrates an example of the probability field generating component 150, which includes prediction component 154 for generating predicted parameters 210 that are received by input modeling component 152, and used to generate a probability field 214, and a target shape component 156 to apply a target shape to generate the shaped probability field.

In one example, the input modeling component 152 may further include a prediction error modeling component 202 for modeling a prediction error corresponding to predicted changes in scene orientation for an image as compared to actual detected changes in scene orientation (e.g., for previous image renderings). For example, prediction component 154 can formulate a prediction of one or more parameters related to scene orientation (e.g., head position, mouse position, etc.) at a time at, or close to, which an image is to be displayed on the display device 102. For example, prediction component 154 can formulate the prediction based at least in part on input from one or more sensors 124, which may include a current position (e.g., from a gyroscope), an acceleration (e.g., from an accelerometer), etc. In addition, for example, prediction error modeling component 202 may obtain the prediction of the one or more parameters related to scene orientation from the prediction component 154 and may receive the actual one or more parameters 212 related to scene orientation (e.g., actual head position, mouse position, etc.), at the time of displaying the image on the display device 102, from the one or more sensors 124. Prediction error modeling component 202 can accordingly generate a model of the prediction error based on one or more differences between the predicted parameters 210 and the actual parameters 212, which can be used in determining a probability field for prioritizing portions of a subsequent image for processing.

In another example, input modeling component 152 can include a human body modeling component 204 for modeling one or more parameters related to limitations in human body movement, which can be based on one or more detected parameters of current body position). For example, given a current body position, such as a head position with respect to the neck or trunk of the body, limitations can be defined for further movement of the head position (e.g., the human head may not be able extend past a certain rotational position). These limitations can be used in determining a probability field 214 for prioritizing portions of a subsequent image for processing.

In a further example, input modeling component 152 can include an application limitation determining component 206 for determining one or more parameters related to limitation in movement defined by the application 110. For example, application 110 may provide or dictate limitations or likelihood of movement related to prioritizing portions of an image of a scene for display where a scene generated by application 110 does not include elements that can be displayed past a certain orientation. For example, if the scene relates to the inside of a room, then the image may not be able to be rendered, or is unlikely to provide rendering, beyond the walls of the room. As such, application limitation determining component 206 may receive one or more parameters related to the limitation, which probability field generating component 150 may use in generating the probability field 214 for prioritizing portions of the image for processing. In addition, for example, probability field generating component 150 can generate the shaped probability field 216 based at least in part on applying the probability field 214 to the original parameter field, representing the original target shape from a target shape component 156, which can be defined for the display device 102.

In some implementations, input modeling component 152 may generate probability field 214 using a combination of prediction error modeling component 202, human body modeling component 204, and/or application limitation determining component 206. For example, prediction error modeling component 202 may incorporate the outputs of human body modeling component 204 and/or application limitation determining component 206 to limit values of probability field 214 that are outputted.

In any case, probability field generating component 150 can generate the probability field 214 that can be applied to the original parameter field, which defines a target shape, from target shape component 156, to generate the shaped probability field 216. For example, the shaped probability field 216 can define a topology of one or more contour lines that can be applied to the image or related scene to determine portions of the image, defined by a perimeter of the one or more contour lines, for prioritizing in processing the image. For example, the shaped probability field 216 can be provided to a downstream node 220. For example, the downstream node 220 can be the same as, or a part of rendering component 140, which can prioritize portions of the image that are within the shaped probability field 216, when applied to the image, for processing (e.g., by overrendering, applying one or more effects, using additional resolution, etc.). In another example, the downstream node 220 can be the same as, or a part of remote source component 144, which can provide the shaped probability field 216 (or one or more related parameters) to a remote display/source 146 for displaying the image and/or for obtaining source data of images for computing device 100 to display, etc., based on portions of the image within the shaped probability field 216, when applied to the image.

Referring to FIG. 3, an example of graphs of probability fields are illustrated on a coordinate system. Examples of coordinate systems 300, 302 include an original target shape 304 for rendering an image on a display device 102. For example, coordinate systems 300, 302 are shown as two-dimensional on two axes coordinate systems that define fields in a plane, however, other implementations may define fields in another coordinate system, such as in a three axis coordinate system. For example, the original target shape 304 can be of substantially any shape, which may include a rectangle (e.g., for a standalone display), a pin-cushion shape to account for lens distortion of a display in a VR device, a circle or ellipse, etc., and may be centered in the coordinate system 300, 302, for the purposes of illustration.

In an example, the original target shape 304, which can be defined by an original parameter field, can additionally correspond to a size (e.g., number of pixels) based on a resolution supported by the display device 102 for displaying images. In an example, probability field generating component 150 can generate a shaped probability field 306, 308 for defining portions of an image to prioritize in processing (e.g., portions to overrender, prioritize quality or performance, etc.), where the shaped probability field can be larger than (e.g., include more pixels when applied to the image than) the original target shape 304. In this example, a portion of the image (e.g., a portion corresponding to the size/shape of the original target shape 304) can be selected from the image within the shaped probability field 306, 308, for display on the display device 102. The shaped probability field 306, 308 can be applied based on the center of the coordinate system 300, 302 to align with the original target shape 304.

For example, in coordinate system 300, the shaped probability field 306 can be the same (or of a similar shape) as the original target shape 304, but can be larger and/or offset from the center of the coordinate system 300 based on output from the input modeling component 152 indicating a probability that portions of the scene within the shaped probability field 306 have a threshold likelihood of being altered before the image is displayed (e.g., based on reprojection of the image). The offset can be determined by the probability field generating component 150 (e.g., based on one or more inputs from the input modeling component 152) to provide an improved area for reprojection that can account for a predicted change of scene orientation (e.g., other than just a larger overrender area centered at the same location in the coordinate system 300 as the original target shape 304).

In another example, in coordinate system 302, the shaped probability field 308 can be of substantially any shape, which can be determined based on predicted parameters and the operation of the input modeling component 152, to provide an improved area for reprojection that can account for a predicted change of scene orientation. In this example, the shaped probability field 308 can include multiple contour lines 310, 312, 314 each defining a different probability that the rendering parameter may be altered between a time for rendering at least a portion of the image and a time for displaying the image (e.g., due to reprojection). Accordingly, for example, rendering component 140 may render an image of the scene based on one or more of the contour lines 310, 312, 314 to provide an improved area for overrendering based on input from input modeling component 152. In addition, though not shown, shaped probability field 306 may also include multiple contour lines of a similar shape as shaped probability field 306 each indicating a different probability.

Though shown graphically on a coordinate system, the shaped probability fields 306, 308 can be defined using a data structure to describe the various contour lines of the topology. For example, the shaped probability fields 306, 308 can be defined by a set of values corresponding to a likelihood of a rendering parameter, such as a parameter indicating whether to render a portion (e.g., pixel) of a scene, acquiring an altered value, such as whether or not to display the portion of the scene in the image, between a time for rendering at least a portion of the image of the scene and a time for displaying the image of the scene. Thus, given the shaped probability field 306, 308, for example, a rendering component 140 can determine portions of an image that are within the shaped probability field 306, 308 for overrendering, prioritizing quality or performance (e.g., by providing additional sampling, effects, etc.), and/or the like, in processing the image. In another example, remote source component 144 can provide the shaped probability field 306, 308, or at least a representation thereof, to remote display/source 146 for determining a portion of the image to provide to the computing device 100 for display.

For example, probability field generating component 150 may generate the shaped probability fields 306, 308 at least in part by determining the original parameter field defining the target shape 304 for selecting, across the image, relative rendering priorities for portions of the image. The probability field generating component 150 may then convolve the original parameter field with the probability field (e.g., the probability field 214 generated based on output of the input modeling component 152) to generate the shaped probability field 306, 308. In one specific example, the probability field generating component 150 can generate the shaped probability field 306, 308 based on convolving the original parameter field with a product of an error distribution, or other output from the input modeling component 152, and the kinematics-based probability field. In one example, convolving the original parameter field in this regard can generate multiple level sets, which may be indicated by the contour lines 310, 312, 314. The multiple level sets, into which the shaped probability field 306, 308 is discretized, may each be based on one of a fixed rendering parameter, a configured rendering parameter, or dynamic rendering parameter, etc. In addition, for example, the relative rendering parameter values assigned to each level set can be determined (e.g., and/or updated in real-time) based on one or more performance metrics of the computing device 100 or processor 104, etc., one or more performance metrics of previous renderings, etc. In addition, the parameter values may include Boolean values (e.g., indicating whether or not to render a corresponding pixel), numerical values (e.g., indicating a quality at which to render or sample the pixel), etc.

In examples further described herein, the probability field may be generated and stored using various possible mechanisms for representing the probability field, and/or corresponding multiple level sets, as areas having corresponding probabilities, where the probabilities correspond to likelihood of a rendering parameter acquiring an altered value between a render time at which at least a portion of the image is rendered and a display time at which the image is displayed. For example, the probability field may be represented in a bitmap or a two-dimensional structure of discrete points, where each point can have an associated probability. In addition, for example, each bit may correspond to a pixel (e.g., when combined or associated with the target shape), either by index in the structure, an explicit indication of pixel position (or positions, or some representation of a range of pixels/pixel positions) associated with the probability, etc. In other examples, splines may be combined to produce non intersecting contours. In yet another example, the probability field may be represented in the structure as a probability circle where, for each degree around the circle, a distance away from the center is specified, where the distance can represent how much the target shape should be expanded in that direction to generate the shaped probability field.

In any case, for example, the probability field may also have a shape, which can be represented by the structure in memory, and can be convolved with, or otherwise applied to, the target shape to produce a shaped probability field of a different shape and including probabilities defined by the probability field for applying to an image of the target shape for improved processing (e.g., overrendering, overprocessing, etc.) of the image, as described herein. For example, in the probability circle example described above, the probability field can be applied to the target shape by sampling each direction of the probability shape (e.g., each specific radius) and expanding the target shape in the direction proportional to the radius (e.g., based on the corresponding specified distance).

FIG. 4 is a flowchart of an example of a method 400 for generating a probability field for prioritizing one or more portions of an image in processing the image. For example, method 400 may be performed by a computing device 100 and/or display device 102 communicatively coupled with one another, and is accordingly described with reference to FIGS. 1-3, for example.

In method 400, optionally at action 402, one or more parameters related to a scene orientation can be predicted for a determined time at which at least a portion of an image of the scene is to be displayed. In an example, prediction component 154, e.g., in conjunction with application 110, processor 104, memory 106, etc., can predict the one or more parameters related to the scene orientation for the determined time at which at least the portion of the image of the scene is to be displayed. For example, the prediction component 154 may predict the one or more parameters related to the scene orientation based on inputs from one or more sensors 124, as described. For example, the one or more parameters related to the scene orientation may include a head position (e.g., based on a position from a gyroscope on a head-mounted display), a head acceleration (e.g., based on an acceleration measured on the head-mounted display), a mouse position from a mouse, a change in direction from a joystick or D-pad, etc. In one specific example, the one or more parameters related to the scene orientation may include render of a controller for externally tracking one or more targets in a virtual environment, which can be composited onto the scene, and thus may benefit from overrendering based on a combination of head motion and the controller. In any case, sensor(s) 124 can provide a current position (e.g., based on previous measured changes in position), which can be mapped to a scene orientation, and one or more parameters related to change in position from which the prediction component 154 predicts a future position. For example, given a current position and acceleration of a head-mounted display, a future position can be predicted, and the future position may correspond to a time at which a rendered image is to be displayed on the display device 102 (e.g., a time at or near a refresh interval).

In method 400, at action 404, a probability field for prioritizing portions of an image of a scene for processing can be determined. In an example, probability field generating component 150, e.g., in conjunction with application 110, input modeling component 152, processor 104, memory 106, etc., can determine the probability field 214 for prioritizing the portions of the image of the scene for processing. In one example, the probability field may include a set of values each corresponding to a likelihood of a rendering parameter acquiring an altered value between a render time at which at least a portion of the image is rendered and a display time at which the image is displayed, as described.

In an example, determining the probability field at action 404 may optionally include, at action 406, determining the probability field based on a model of prediction error. In an example, probability field generating component 150, e.g., in conjunction with application 110, input modeling component 152, prediction error modeling component 202, processor 104, memory 106, etc., can determine the probability field 214 based on the model of prediction error. For example, prediction error modeling component 202 can generate a model of prediction error based on previous predictions of the one or more parameters related to scene orientation by prediction component 154 and corresponding actual one or more parameters at the time for which the parameters were predicted. For example, prediction component 154 may predict a head position of a head-mounted display at a time corresponding to a refresh interval for the head-mounted display. Sensor(s) 124 may determine the actual position of the head-mounted display at the time corresponding to the refresh interval. Prediction error modeling component 202 can accordingly model the prediction error based at least in part on comparing the predicted head position to the actual head position (e.g., on a three-dimensional coordinate system), and can do so for a number of previous predictions. Probability field generating component 150, in this example, can use this prediction error model in determining the probability field 214, which may include the set of values corresponding to a likelihood of a rendering parameter acquiring an altered value, for prioritizing portions of the image for processing.

For example, the prediction error model may relate to substantially any level of granularity, such as an average prediction error in a certain direction, an average prediction error given a current position or range of current positions, a direction of the error on the three-dimensional coordinate system, etc. In any case, probability field generating component 150 can provide one or more parameters, such as the one or more predicted parameters related to scene orientation (e.g., predicted head position) to the prediction error modeling component 202 to obtain one or more parameters related to prediction error. In one example, the prediction error modeling component 202 can provide a probability of predicted scene orientation parameters (e.g., head position) in a plurality of directions on the three-dimensional space. Probability field generating component 150 can accordingly translate the probability to a probability field 214 (e.g., in a two-dimensional space) for prioritizing portions of the image to better account for the prediction of scene orientation (e.g., head movement or position on a head-mounted display).

In another example, determining the probability field at action 404 may optionally include, at action 408, determining the probability field based on one or more parameters related to limitations in human body movement. In an example, probability field generating component 150, e.g., in conjunction with application 110, input modeling component 152, human body modeling component 204, processor 104, memory 106, etc., can determine the probability field 214 based on one or more parameters related to limitations in human body movement. For example, human body modeling component 204 can include one or more parameters related to limitation of movement in head position (e.g., on the three-dimensional plane). In this example, probability field generating component 150 can generate the probability field 214, which may include the set of values corresponding to a likelihood of a rendering parameter acquiring an altered value, based on the one or more parameters and/or a current body part position (e.g., head position). For example, sensor(s) 124 may detect a current head position with respect to a neck, trunk, etc. of the body, and probability field generating component 150 can determine the probability field for prioritizing portions of the image based on determining that the head position may be limited in one direction or another based on the one or more parameters in the human body model. For example, where the probability field generating component 150 determines that the head position is substantially looking left at a position near the musculoskeletal limit of movement to the left, probability field generating component 150 can generate the probability field 214 to include less of the scene to the left (e.g., and/or more of the scene to the right) of the predicted scene orientation (e.g., as shown in shaped probability field 306, 308 respective to original target shape 304).

In another example, determining the probability field at action 404 may optionally include, at action 410, determining the probability field based on one or more parameters related to limitations in movement defined by an application. In an example, probability field generating component 150, e.g., in conjunction with application 110, input modeling component 152, application limitation determining component 206, processor 104, memory 106, etc., can determine the probability field 214, which may include the set of values corresponding to a likelihood of a rendering parameter acquiring an altered value, based on one or more parameters related to limitations in, or likelihood of, movement defined by the application. For example, application 110 may limit the scene that can be displayed, or can otherwise indicate that portions of the scene as being of low interest, and thus a change in scene orientation may result in reaching a limit of the scene, or a portion of the scene that is unlikely to be rendered. The application 110 can provide one or more parameters regarding the scene limitations, which application limitation determining component 206 can obtain for use in generating the probability field 214. For example, where the scene from the application 110 is limited, or indicated as being of low interest, in one direction, probability field generating component 150 can generate the probability field 214 to include less of the scene in this direction and/or more of the scene in the opposite direction.

In another example, the application 110 may provide one or more parameters related to generating the probability field 214, such as a portion of a scene that may be of high interest (e.g., a portion at which an item is introduced or something that may be determined to likely attract the attention of a user viewing the display device 102, such as a flash or explosion in a game). In this example, probability field generating component 150 may generate the probability field 214 to include the portion of the scene, or at least a part of the scene in the direction of the portion from a current orientation of the scene.

In some implementations, determining the probability field at action 404 may optionally be based on any combination of two or more of actions 406, 408, or 410.

In another example, method 400 may include, at action 412, generating a shaped probability field based on applying the probability field to an original target shape. In an example, probability field generating component 150, e.g., in conjunction with application 110, processor 104, memory 106, target shape component 156, etc., can generate the shaped probability field 216 based on applying the probability field 214 to an original target shape (e.g., as defined by an original parameter field). In any case, probability field generating component 150 can generate the shaped probability field 216 (e.g., shaped probability field 306, 308) as a region surrounding (e.g., larger than and/or inclusive of) the original target shape (e.g., target shape 304). This may include associating a center point of the shaped probability field with a center point of the target shape (e.g., the center of coordinate system 300, 302).

In addition, probability field generating component 150 can generate the shaped probability field 216 to define one or more level sets (e.g., as represented using concentric contours in FIG. 3) based on input from the input modeling component 152, as described. For example, the multiple level sets can be defined to include different areas of the shaped probability field 216, where each different area corresponds to a different probability parameter value (e.g., of a fixed rendering parameter, a configured rendering parameter, or dynamic rendering parameter, etc.). The shaped probability field 216, or related level sets, may be defined to be of substantially any shape. Additionally, for example, the shaped probability field 216 can be represented in memory 106 as described above (e.g., as a bitmap or other representation of discrete points that define the probability field as an area or perimeter of one or more sets of probability values). When applied to the image, the shaped probability field 216 can include portions of the image with at least a threshold probability of being included in a predicted change of scene orientation (e.g., regions corresponding to a predicted head movement of a head-mounted display).

In method 400, at action 414, the shaped probability field can be provided to a downstream node for prioritizing, based at least in part on one or more of a set of values in the probability field, a portion of the image in processing the image. In an example, probability field generating component 150, e.g., in conjunction with application 110, processor 104, memory 106, etc., can provide the shaped probability field 216 to the downstream node for prioritizing, based at least in part on one or more of a set of values in the probability field, a portion of the image in processing the image. For example, probability field generating component 150 can provide the shaped probability field 216 to a downstream node 220, which may include a rendering component 140, remote source component 144, etc. In one example, the rendering component 140 can utilize the shaped probability field 216 to determine an overrendering region for overrendering the image, as described further below with respect to FIG. 5. In another example, the remote source component 144 can provide the shaped probability field 216 to the remote display/source 146 for displaying an image and/or for providing a portion of an image for display by computing device 100. For example, the remote display/source 146 may provide a stream for demand-based video streaming, and can prioritize the video stream (e.g., prioritize which parts get downloaded first) based at least in part on the shaped probability field 216 to provide priority to portions of the stream within the shaped probability field 216 when providing the stream to the computing device 100 for display.

In method 400, optionally at action 416, one or more parameters related to the prediction of the scene orientation can be provided to the model of prediction error. In an example, prediction component 154, e.g., in conjunction with application 110, processor 104, memory 106, etc., can provide the one or more parameters related to the prediction of the scene orientation to the model of prediction error (e.g., to prediction error modeling component 202). For example, prediction component 154 can provide the predicted head position, as described, to the model of prediction error, and/or can provide the actual head position (e.g., as measured by sensor(s) 124 corresponding to the time of displaying the image on display device 102) to the model of prediction error as a feedback loop for using at least the corresponding prediction error in subsequently determining the probability field.

FIG. 5 is a flowchart of an example of a method 500 for overrendering an image based on generating a probability field. For example, method 500 may be performed by a computing device 100 and/or display device 102 communicatively coupled with one another, and is accordingly described with reference to FIGS. 1-3, for example.

Method 500 may include actions similar to those in method 400, namely, optionally at action 402, predicting one or more parameters related to a scene orientation for a determined time at which at least a portion of an image of the scene is to be displayed, at action 404, determining a probability field for prioritizing portions of an image of a scene for processing, at action 412, generating a shaped probability field based on applying the probability field to an original target shape, and at action 414, providing the shaped probability field to a downstream node for prioritizing, based at least in part on one or more of a set of values in the probability field, a portion of an image in processing the image.

In addition, providing the shaped probability field to the downstream node, at action 412, may optionally include, at action 502, overrendering the image based on the shaped probability field to generate an overrendered image. In an example, rendering component 140, e.g., in conjunction with application 110, processor 104, memory 106, etc., can overrender the image based on the shaped probability field to generate the overrendered image. For example, rendering component 140 can obtain parameters regarding the shaped probability field, the associated topology and/or contour lines (e.g., level sets), etc., and can render pixels falling within one or more of the contour lines (e.g., as centered on the target shape 304 for rendering) to generate the overrendered image based on a corresponding probability that the associated portions of the image may be included in a reprojected image of the scene. As described, the overrendered image may define a shape (e.g., based on shaped probability field 306, 308) that includes portions of an image of a scene that are outside of the original target shape (e.g., target shape 304), and may be of a shape that includes portions of the image predicted to include a change of scene orientation, as described.

In an example, overrendering the image at action 502 may include, at action 504, overrendering the image at least in part by rendering one or more portions at different resolutions. In an example, rendering component 140, e.g., in conjunction with application 110, processor 104, memory 106, etc., can overrender the image at least in part by rendering the one or more portions at different resolutions. For example, rendering component 140 may receive an importance mask (e.g., from application 110) indicating areas of the scene for which higher or lower quality for rendering is desired. Rendering component 140 can accordingly render the one or more portions at different qualities (e.g., resolutions, pixel samplings, etc.) based on the importance mask. For example, the importance mask may indicate an importance value for each pixel or a portion of pixels, where the importance value may indicate whether to render the pixel at a high or low resolution, and/or may specify one of multiple resolutions at which to render the pixel. Rendering component 140 can accordingly render the pixels in the shaped probability field.

In addition, providing the shaped probability field to the downstream node, at action 412, may optionally include, at action 506, determining an actual (e.g., current) scene orientation at a time for displaying at least the portion of the overrendered image. In an example, reprojecting component 142, e.g., in conjunction with application 110, processor 104, memory 106, etc., can determine the actual scene orientation at the time for displaying at least the portion of the overrendered image. For example, reprojecting component 142 can determine the actual scene orientation based on input from the one or more sensors 124, such as a position of a head-mounted display (e.g., as obtained from a gyroscope), etc.

In this regard, providing the shaped probability field to the downstream node, at action 412, may also optionally include, at action 508, displaying, based at least in part on the actual scene orientation, at least the portion of the overrendered image. In an example, reprojecting component 142, e.g., in conjunction with application 110, processor 104, memory 106, etc., can display, based at least in part on the actual scene orientation, at least the portion of the overrendered image. For example, reprojecting component can select the portion of the overrendered image based on the actual scene orientation, and the overrendered image may include all or at least some of the portion. Thus, the image displayed on the display device 102 can reflect the actual scene orientation (e.g., based on the head position of the head-mounted display).

Figure 6:
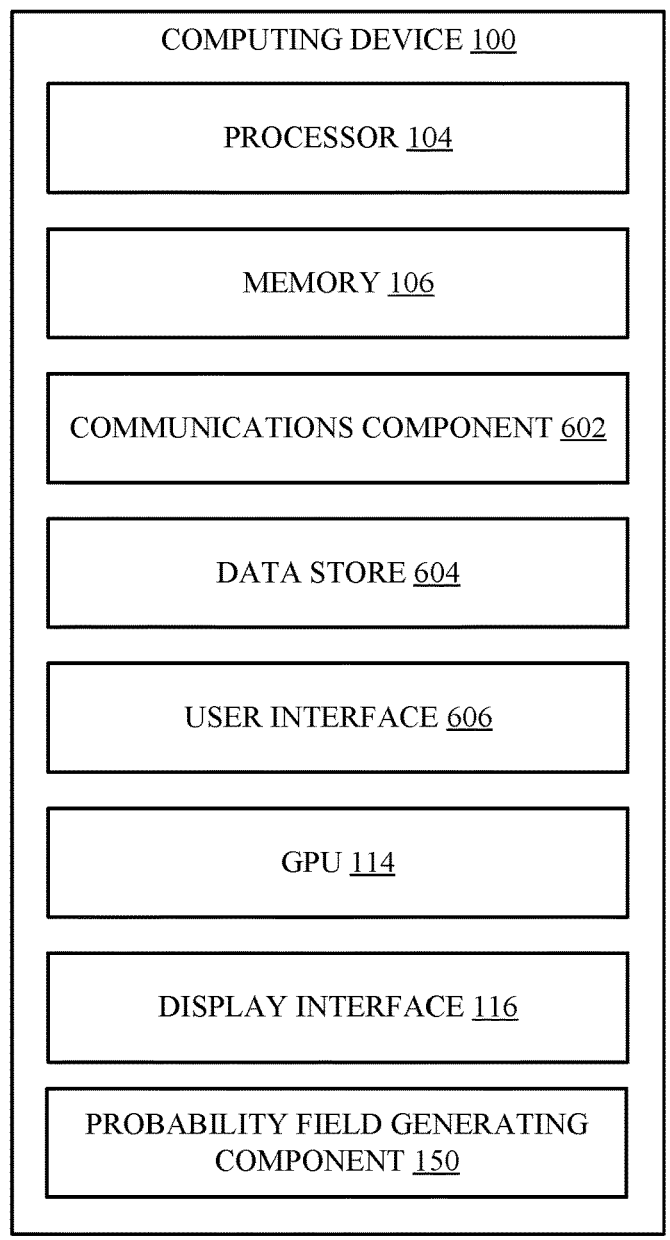
FIG. 6 is a schematic diagram of an example of a computing device for performing functions described herein.

FIG. 6 illustrates an example of computing device 100 including additional optional component details as those shown in FIG. 1. In one example, computing device 100 may include processor 104 for carrying out processing functions associated with one or more of components and functions described herein. Processor 104 can include a single or multiple set of processors or multi-core processors. Moreover, processor 104 can be implemented as an integrated processing system and/or a distributed processing system.

Computing device 100 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute an operating system executing on processor 104, one or more applications, display drivers, etc., as described herein, and/or other components of the computing device 100.

Further, computing device 100 may include a communications component 602 that provides for establishing and maintaining communications with one or more other devices, parties, entities, etc. utilizing hardware, software, and services as described herein. Communications component 602 may carry communications between components on computing device 100, as well as between computing device 100 and external devices, such as devices located across a communications network and/or devices serially or locally connected to computing device 100. For example, communications component 602 may include one or more buses, and may further include transmit chain components and receive chain components associated with a wireless or wired transmitter and receiver, respectively, operable for interfacing with external devices.

Additionally, computing device 100 may include a data store 604, which can be any suitable combination of hardware and/or software, that provides for mass storage of information, databases, and programs employed in connection with examples described herein. For example, data store 604 may be or may include a data repository for applications and/or related parameters not currently being executed by processor 104. In addition, data store 604 may be a data repository for an operating system, application, display driver, etc. executing on the processor 104, and/or one or more other components of the computing device 100.

Computing device 100 may also include a user interface component 606 operable to receive inputs from a user of computing device 100 and further operable to generate outputs for presentation to the user (e.g., via display interface 116 to a display device). User interface component 606 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 606 may include one or more output devices, including but not limited to a display interface 116, a speaker, a haptic feedback mechanism, a printer, any other mechanism capable of presenting an output to a user, or any combination thereof.

Computing device 100 can also include a GPU 114, as described herein, for rendering frames based on rendering instruction received from processor 104. GPU 114 can additional send signals via a display interface 116 to cause display of the rendered frames on a display device. Additionally, computing device 100 may include a probability field generating component 150, as described herein, to generate probability fields for prioritizing portions of images for processing based on one or more input models.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more."Unless specifically stated otherwise, the term "some" refers to one or more. All structural and functional equivalents to the elements of the various examples described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for processing images using probability fields in a computing device, comprising:
    determining a probability field for prioritizing portions of an image of a scene for processing, wherein the probability field comprises a set of values each corresponding to a likelihood of a rendering parameter acquiring an altered value between a render time at which at least a portion of the image is rendered and a display time at which the image is displayed;
    convolving the probability field with an original target shape associated with a display device to generate a shaped probability field; and
    providing the shaped probability field to a downstream node for prioritizing, based at least in part on one or more of the set of values in the probability field, a portion of the image in processing the image.

2. The method of claim 1, wherein convolving the probability field with the original target shape comprises:
    determining an original parameter field, corresponding to the original target shape, for selecting, across the image, relative rendering priorities for portions of the image; and
    applying the probability field to the original parameter field to generate the shaped probability field.

3. The method of claim 2, wherein the shaped probability field is discretized into multiple level sets, wherein each of the multiple level sets are based on one of a fixed rendering parameter, a configured rendering parameter, or a dynamic rendering parameter.

4. The method of claim 3, wherein the shaped probability field is discretized into multiple level sets based on one or more performance metrics updated in real-time.

5. The method of claim 1, wherein the set of values correspond to a model of prediction error generated based on comparing one or more previous predicted scene parameter values of a scene orientation of a previous image to corresponding one or more previous actual scene parameter values of the scene orientation of the previous image.

6. The method of claim 5, wherein the one or more previous predicted scene parameter values of the scene orientation and the one or more previous actual scene parameter values correspond to at least one of position or orientation values of a head-mounted display.

7. The method of claim 5, wherein the one or more previous predicted scene parameter values of the scene orientation and the one or more previous actual scene parameter values correspond to at least one of position or orientation values of one or more externally tracked targets.

8. The method of claim 5, wherein the one or more previous predicted scene parameter values of the scene orientation and the one or more previous actual scene parameter values correspond to at least one of position or orientation values of one or more actuated displays or emitters.

9. The method of claim 1, wherein the set of values incorporate limitations in human body movement.

10. The method of claim 1, wherein the set of values incorporate a likelihood of movement in one or more directions as defined by an application executing to display the image.

11. The method of claim 1, further comprising obtaining an importance mask indicating different resolutions for rendering one or more portions of the image, wherein the downstream node overrenders the image at least in part by rendering the one or more portions at the different resolutions based on the importance mask.

12. The method of claim 1, wherein the downstream node is a remote video source for demand-based video streaming.

13. The method of claim 12, wherein the remote video source is configured to prioritize a video stream based at least in part on the shaped probability field.

14. A computing device for processing images using probability fields, comprising:
    a memory storing one or more parameters or instructions for executing an operating system and one or more applications;
    a display interface coupled with a display device for communicating signals to display rendered frames on the display device; and
    at least one processor coupled to the memory and the display interface, wherein the at least one processor is configured to:
        determine a probability field for prioritizing portions of an image of a scene for processing, wherein the probability field comprises a set of values each corresponding to a likelihood of a rendering parameter acquiring an altered value between a render time at which at least a portion of the image is rendered and a display time at which the image is displayed;
        convolve the probability field with an original target shape associated with a display device to generate a shaped probability field; and
        provide the shaped probability field to a downstream node for prioritizing, based at least in part on one or more of the set of values in the probability field, a portion of the image in processing the image for display on the display device.

15. The computing device of claim 14, wherein the at least one processor is configured to convolve the probability field with the original target shape at least in part by:
    determining an original parameter field, corresponding to the original target shape, for selecting across the image, relative rendering priorities for portions of the image; and
    applying the probability field to the original parameter field to generate the shaped probability field.

16. The computing device of claim 14, wherein the set of values correspond to a model of prediction error generated based on comparing one or more previous predicted scene parameter values of a scene orientation of a previous image to corresponding one or more previous actual scene parameter values of the scene orientation of the previous image.

17. The computing device of claim 16, wherein the one or more previous predicted scene parameter values of the scene orientation and the one or more previous actual scene parameter values correspond to at least one of position or orientation values of a head-mounted display, position or orientation values of one or more externally tracked targets, or position or orientation values of one or more actuated displays or emitters.

18. The computing device of claim 16, wherein the set of values incorporate at least one of limitations in human body movement or a likelihood of movement in one or more directions as defined by an application executing to display the image.

19. A non-transitory computer-readable medium, comprising code executable by one or more processors for processing images using probability fields in a computing device, the code comprising code for:
   determining a probability field for prioritizing portions of an image of a scene for processing, wherein the probability field comprises a set of values each corresponding to a likelihood of a rendering parameter acquiring an altered value between a render time at which at least a portion of the image is rendered and a display time at which the image is displayed;
   convolving the probability field with an original target shape associated with a display device to generate a shaped probability field; and
   providing the shaped probability field to a downstream node for prioritizing, based at least in part on one or more of the set of values in the probability field, a portion of the image in processing the image.

20. The non-transitory computer-readable medium of claim 19, wherein the code for convolving the probability field with the original target shape comprises code for:
   determining an original parameter field, corresponding to the original target shape, for selecting, across the image, relative rendering priorities for portions of the image; and
   applying the probability field to the original parameter field to generate the shaped probability field.

* * * * *